E. J. B. WHITAKER,

Assignor to G. W. & W. T. WHITAKER.

TRUNDLING TOY HORSE.

No. 10,480. Reissued May 13, 1884.

*Witnesses.*

A. W. Steiger.

J. Ackerson

*Inventor.*

Elijah J. B. Whitaker

By Lyman A. Burr

*Attorney*

N. PETERS, Photo-Lithographer, Washington, D. C.

UNITED STATES PATENT OFFICE.

ELIJAH J. B. WHITAKER, OF NEW YORK, N. Y., ASSIGNOR TO GEORGE W. WHITAKER AND WILLIAM T. WHITAKER, OF BALTIMORE, MD.

TRUNDLING TOY HORSE.

SPECIFICATION forming part of Reissued Letters Patent No. 10,480, dated May 13, 1884.

Original No. 255,367, dated March 21, 1882. Application for reissue filed March 24, 1884.

*To all whom it may concern:*

Be it known that I, ELIJAH J. B. WHITAKER, a citizen of the United States of America, residing in the city, county, and State of New York, have invented certain new and useful Improvements in Trundling Toy Horses; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

My invention relates to a trundling toy for children in the form of a horse mounted on two wheels, to be pushed by a rod and guided by lines arranged along and above the horse's back in a manner to imitate the real thing.

Figure 1:
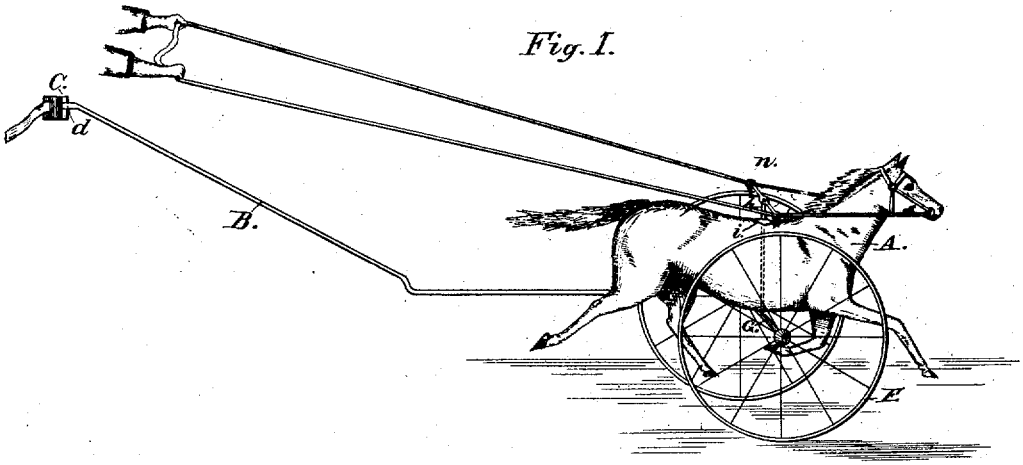
Figure 2:
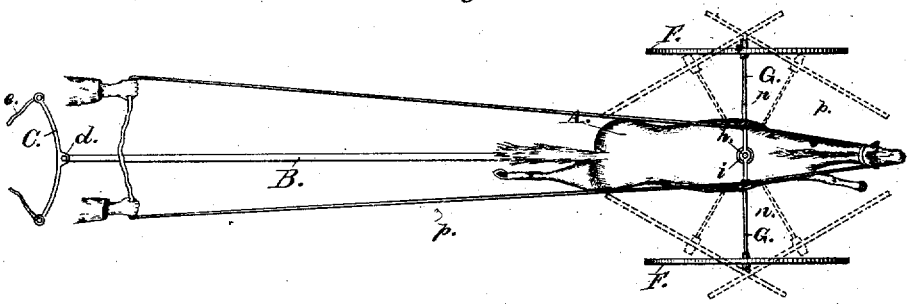

In the drawings hereto annexed, Figure 1 is a side view, and Fig. 2 is a top view, of the toy.

The letter A designates the animal, which in the present instance represents a horse.

B is the push-tongue, which, it will be observed, has a curve to render it flexible. One end of the tongue is rigidly attached to the body of the horse. At the other end of the tongue a push-plate, C, is connected by a flexible joint, *d*. The push-plate is segment-shaped, to adapt it to fit partly about the waist of the child, and a belt, *e*, connects at each end of the push-plate, and is adapted to be buckled about the person. By these or similar means the end of the push-tongue is sustained against and in front of the child.

The letter F designates a pair of wheels, which are connected by an axle, G. Attached rigidly at the central part of the axle is an upright post, *h*, which serves as a steering-post. This post is provided with a flange or collar (not shown) a short distance above the axle, and the body of the animal is swiveled loosely about the post and rests upon the flange or collar. A second flange or collar, *i*, about the post, just above the animal's back, serves to confine the body of the animal to the post, leaving it free, however, to turn thereon. At the upper end of the post is attached a cross-bar, *k*, which is provided at each end with an eye or ring, *n*. When the cross-bar is in position crosswise of the animal's back, the rings *n* resemble the ordinary terrets of a harness-saddle, though the lines *p*, instead of passing freely through, are securely attached to them; and from the ring at one end the line passes forward to and freely through a hole in the animal's mouth, and thence returns along the opposite side of the animal's head and neck, to the ring at the other end of the cross-bar. By this arrangement, when one line is drawn on by the hands of the child the cross-bar on the steering-post is turned, and thus the wheels are guided in one direction. As the cross-bar turns independent of the animal's body, that part of the line which passes through the animal's mouth must slip freely. This arrangement of lines to pass freely through the animal's mouth, and the guiding mechanism above the animal's back, gives an appearance resembling the arrangement as actually employed with real horses.

I am aware that toys representing an animal mounted on two wheels to be pushed and to be guided by lines were well known before my present invention. My invention, therefore, is limited to the combination as hereinafter set forth in the claims.

Having described my invention, I claim and desire to secure by Letters Patent of the United States—

1. The combination, with a flexible push tongue or rod, adapted to be sustained at one end upon or against the body of a child, of an axle and pair of wheels swiveled to the opposite end of said flexible push tongue or rod, and of lines adapted to turn and steady the axle, substantially in the manner and for the purpose herein set forth.

2. The combination, with an axle and pair of wheels swiveled to a push tongue or rod adapted to the propulsion thereof, guide-lines for steadying and steering the same, and a device representing an animal supported and carried thereby, of rings or terrets *n*, elevated over the figure of the animal and above the top of the wheels, to carry and support the guide-lines clear of entanglement with the wheels in turning, substantially in the manner and for the purpose herein set forth.

3. The combination of the axle provided with an upright steering-post, a device representing an animal loosely swiveled on the steering-post, a cross-bar rigidly attached to the steering-post above the back of the animal, and guide-lines connected to the cross-bar, as set forth.

4. A toy consisting of a device representing an animal provided with a push-tongue rigidly attached to the animal, an axle of a pair of wheels swiveled below and independent of the animal, and lines to turn the axle independent of the animal, as set forth.

5. In a trundling toy, the combination of a pair of wheels, an axle connecting the wheels, provided with an upright steering-post, a device representing an animal loosely swiveled on the steering-post and having a hole through its mouth, a cross-bar rigidly attached to the steering-post, and guide-lines connected to the cross-bar, and extending from one end thereof to and freely through the hole in the animal's mouth, and thence back to the other end of the cross-bar, as set forth.

In testimony whereof I affix my signature in presence of two witnesses.

E. J. B. WHITAKER.

Witnesses:

A. W. STEIGER,

J. F. ACKER, Jr.